June 3, 1952 R. M. ROWELL 2,599,287
WIDE FREQUENCY RANGE POWER-FACTOR METER
Filed May 23, 1950 2 SHEETS—SHEET 1
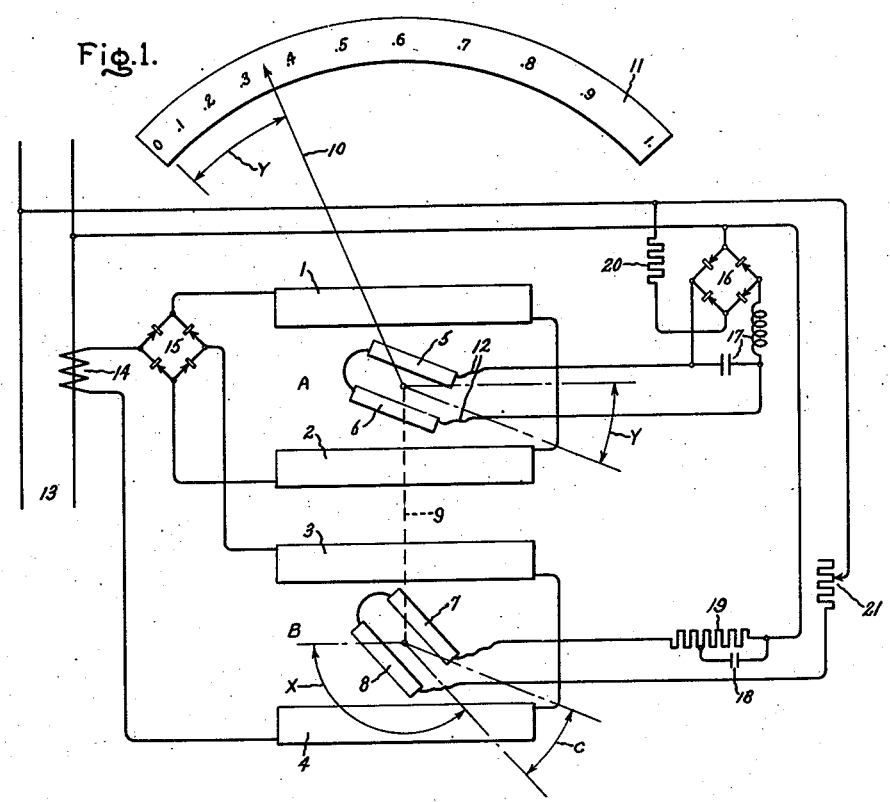
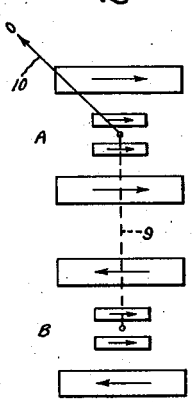
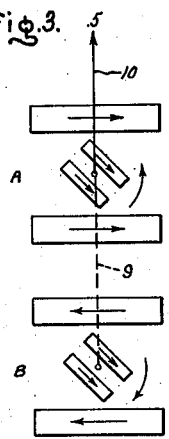
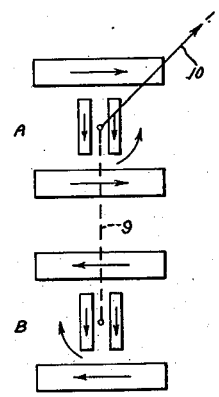
Inventor:
Ralph M. Rowell,
by Russell A. Warner
His Attorney.

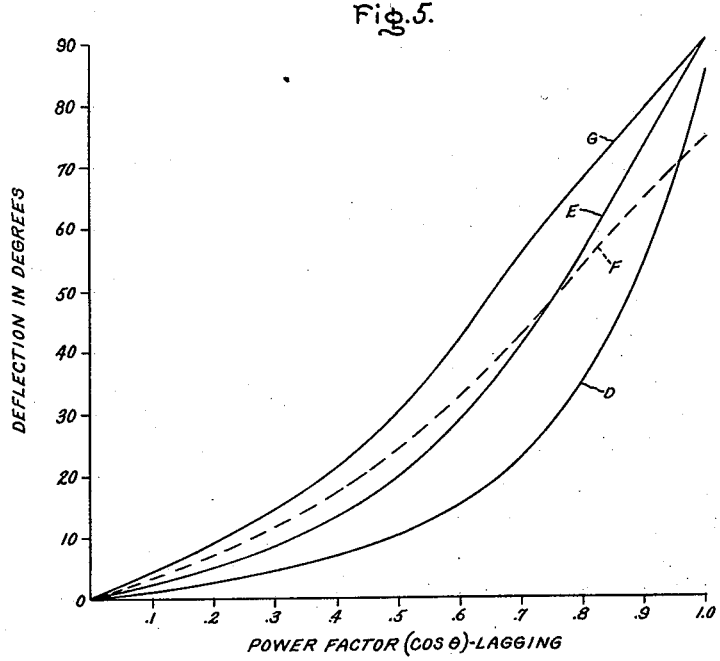
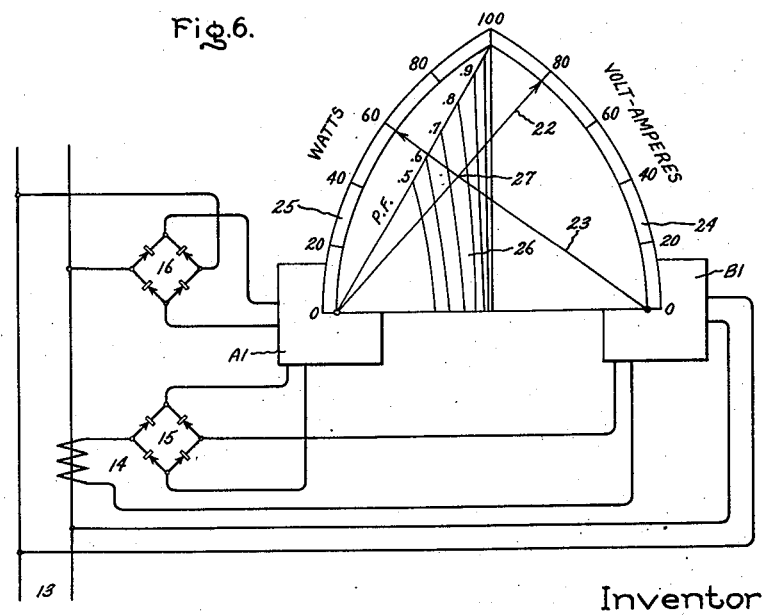

UNITED STATES PATENT OFFICE 2,599,287

WIDE FREQUENCY RANGE POWER-FACTOR METER

Ralph M. Rowell, Lynn, Mass., assignor to General Electric Company, a corporation of New York Application May 23, 1950, Serial No. 163,705

5 Claims. (Cl. 172—245)

My invention relates to power-factor responsive apparatus including meters and relays, and its object is to provide power-factor responsive apparatus and a method of power-factor measurement which are accurate over a wide range of frequency variation.

In usual single-phase power-factor meters, operation is obtained by utilizing a phase splitting network to obtain a potential approximately 90 degrees out of phase from line potential. Since this involves use of inductance coils or capacitors, such usual power-factor meters become very frequency sensitive since changes in frequency affect both the phase angle and the magnitude of the current supplied through such phase shifting network, and it has good accuracy only at one frequency.

According to my invention in its preferred form, I provide a power-factor responsive apparatus which utilizes an alternating current dynamometer unit having a torque responsive to watts, and a direct current dynamometer unit having a torque responsive to volt-amperes. These units are both energized from the current and voltage of the circuit being metered, but one is energized through rectifiers. The moving elements of both units are mounted on the same shaft so that their torque ratios may be compared in terms of power factor. The frequency sensitive phase shifting network usually employed in power-factor measurement apparatus becomes unnecessary, and hence, the meter is accurate over a wide range of frequency variation.

The features of my invention which are believed to be novel and patentable will be pointed out in the claims appended hereto. For a better understanding of my invention, reference is made in the following description to the accompanying drawing in which Fig. 1 represents diagrammatically a preferred embodiment of my invention. Figs. 2, 3 and 4 show comparative armature coil positions for zero, .5 and unity power-factor conditions of a power-factor meter embodying the main principle of my invention for the purpose of explaining such principle. Fig. 5 shows different scale distribution curves that may be obtained in my power-factor meter by changing the angular positions of the coils of the upper and lower dynamometer units and also the effect of changing the ampere turns in such units. For these curves, the abscissas are graduated in power factor and the ordinates in degrees deflection. Fig. 6 represents an embodiment of my invention where the relative torques of watt and volt-ampere measuring instruments are compared visually by a pointer crossing arrangement.

Referring now to Fig. 1, my power-factor meter or relay comprises two dynamometer type torque units A and B, each having a stationary winding consisting of coils, the stationary coils for unit A being designated by 1 and 2, and the stationary winding of unit B consisting of coils 3 and 4. Each unit has a moving winding or coil system consisting of coils 5 and 6 for unit A, and coils 7 and 8 for unit B, and each is of the type which has a 90 degree angle between zero and maximum torque positions. The moving elements for the two units are mounted on a common shaft diagrammatically indicated at 9, shown as carrying a pointer 10 which indicates on a power factor scale 11. It is to be understood that in Fig. 1, as also in Figs. 2, 3 and 4, axial offset views of the coils are represented. Where the apparatus is to be used as a relay or for recording purposes, it will be provided with the usual facilities for such uses. The moving coils will be provided with lead-in spirals designated by the flexible leads as at 12, but these spirals will be very light and otherwise arranged to produce no resultant torque on the shaft 9 within the measurement range of the apparatus.

The stationary windings are connected to be energized in response to the current flowing in the signle-phase alternating current to be metered, represented at 13, and where the line current is larger than is suitable for instruments, a current reducing current transformer, represented at 14, will be used. Preferably, the stationary windings of the units A and B are energized from the same secondary coil of the same current transformer as represented, but this is not essential to the invention so long as both are energized in fixed proportion to the current in the line 1.

One unit A has its stationary winding energized by direct current by reason of the full wave rectifier 15, while the other unit B is energized by alternating current. The alternating current terminals of the rectifier 15 are in series with coils 3 and 4 of unit B, and the direct current terminals are in series with the coils 1 and 2 of unit A. The moving coils of the two units are energized in proportion to the voltage of line 13. Coils 5 and 6 of unit A are energized in series from line 13 through a full wave rectifier 16, and hence, by direct current. Coils 7 and 8 of unit B are energized in series from line 13 by alternating current.

It will now be apparent that unit A, which has its field and armature energized by direct currents respectively proportional to the current I and voltage E of line 13, is capable of producing a torque proportional to EI or volt-amperes; and that unit B, which has its field and armature energized by alternating currents respectively proportional to and in phase with current I and voltage E of line 13, is capable of producing a torque proportional to $EI \cos \phi$ or watts, where $\phi$ is the phase angle between E and I of line 13. The torques of units A and B are arranged to oppose each other so that the resultant rotary position of shaft 9 will correspond to the ratio $$\frac{\text{watts}}{\text{volt-amperes}} = \frac{EI \cos \phi}{EI} = \cos \phi$$

or power factor.

For best results, certain practicable considerations require attention as will now be explained. Let us assume first that the armature coils of units A and B are so connected and mounted on shaft 9 in such relation that when unit A is in its zero torque position, unit B is 180 degrees from its zero torque position. Then when the meter is energized and the power factor is zero, the resultant torque position may be as represented in Fig. 2. Thus, the alternating current wattmeter unit B is 180 degrees from zero torque position, but since the power factor is assumed to be zero, it has no torque in any position. The direct current volt-ampere unit A is in its zero torque position, but if it were moved from such position, it would immediately develop torque to return it to its zero torque position. Hence, Fig. 2 represents the rotary position of the apparatus for the conditions assumed, and we may mark the position of pointer 10 on its scale 0 power factor.

Assume now that the power factor of the meter of Fig. 2 changes to unity, but that current and voltage values remain the same. Under this condition, the torques of units A and B will be equal and opposite, and the shaft and moving coils will assume the position represented in Fig. 4, 90 degrees from the Fig. 2 position, and we may mark the pointer position unity power factor.

Assume now that the power factor changes to .5 with the other conditions remaining the same. The moving parts will now take some such position as represented in Fig. 3 because when the power factor changed from 1 to .5, the torque ability of the volt-ampere unit A remained as before, while that of the wattmeter element decreased due to the decrease in power factor. In turning from the position of Fig. 4 to that of Fig. 3, the unit A rotor has turned towards its zero torque position, and hence, its actual torque in position Fig. 3 is less than in Fig. 4. The rotor element of the combinations thus turns to a position (Fig. 3) where the opposing torques become equal.

It will be evident that with the stationary coils in exact alignment and the rotor coils in exact 180-degree alignment as pictured in Figs. 2, 3 and 4, when the power factor changes from zero to some other value, the rotor element is just as apt to turn to the left in Fig. 2 as to the right because the coils of unit B are in what may be considered a dead-center position and, in fact, unless vibrated or otherwise moved off from a dead-center position in one direction or the other, will not move at all. To avoid these difficulties, it is desirable to rotate either the stator coils of the two units with respect to each other or their rotor coils with respect to each other by a small amount.

Returning now to Fig. 1, it is noted that the moving coil of unit B has been rotated relative to the corresponding coil of unit B by an angle C. The length and distribution of the scale is influenced by the value of the angle C and the ratio of ampere turns in units A and B, and these influencing factors may be varied to best suit the range of power-factor measurement for which the meter is to be used, as will now be explained.

For any deflection of the instrument within the desired scale range, the torques of the upper and lower elements may be computed and the position of torque equilibrium determined. The torque equilibrium equation is, $$N_{CA}I_{CA}N_{PA}I_{PA} \tan Y + N_{CB}I_{CB}N_{PB}I_{PB} \cos (X+Y) \tan Y \cos \theta = N_{CB}I_{CB}N_{PB}I_{PB} \sin (X+Y) \cos \theta$$

$N_{CA}$=turns in current coils A (upper)
$I_{CA}$=current in current coils A (upper)
$N_{PA}$=turns in potential coils A (upper)
$I_{PA}$=current in potential coils A (upper)
$N_{CB}$=turns in current coils B (lower)
$I_{CB}$=current in current coils B (lower)
$N_{PB}$=turns in potential coils B (lower)
$I_{PB}$=current in potential coils B (lower)
$Y$=angle between upper potential coils and upper current coils (also equals angular deflection of pointer from zero).
$X$=angle between lower current coils and lower potential coils (taking into account the reversed direction of the current coils).
$\cos \theta$=power factor.

For the position of the moving element of the meter represented in Fig. 1, angle Y is about 20 degrees; angle X is about 130 degrees; and angle C, which is equal to $180° - (X+Y)$, is about 30 degrees.

Refer to Fig. 5 where I have shown distribution curves for my power-factor meter for different values of the angle C and for different ampere-turn ratios in the moving coils of units A and B. Curve D shows the power-factor-degrees deflection characteristic where angle C is 10 degrees and the ampere-turn ratio in units A and B is the same. This gives a crowded scale condition at low power factors and a scale length of 85 degrees between zero and unity power factor.

Curve E is the result obtained by making angle C 20 degrees and increasing the ampere turns in the moving coil system of unit B with respect to unit A so that this ratio is 1.06/1. This increases the scale length to 90 degrees and improves the distribution somewhat. Curve F is the result of making the angle C 30 degrees and the ampere-turn ratio unity. The distribution is further improved, but the scale length is shortened to 74 degrees. Curve G is the result obtained by making angle C 30 degrees and using a 1.15/1 ratio between the ampere turns in the moving coil systems of units A and B. In all cases, the ampere-turn ratio in the stationary coil systems was kept at unity. It is noted that curve G represents a 90-degree scale length and a very satisfactory scale distribution for the more common existing power-factor condition, where that portion of the power-factor scale between .5 and unity will be most frequently used. The scale distribution shown in Fig. 1 corresponds substantially to curve G. Using a 40-degree angle for C with the ampere-turn ratio used for curve G will shown a tendency to crowd the upper end of the scale, which will be undesirable for the most common power-factor conditions.

It is desirable to provide a filter in one of the rectified circuits, preferably the voltage circuit as shown at 17 in Fig. 1, to smooth out the output current and prevent changes that might otherwise be due to different relative phase positions of current and voltage rectified waves. The rectifiers used may be of the dry or vacuum tube type.

Since the lower alternating element B is connected directly to the high frequency line, it will exhibit some reactance which will tend to cause error when the meter is used over wide ranges of frequency unless compensated for. This tendency may be compensated for by connecting a small condenser 18 across a portion of the series resistance 19 of the alternating current unit B. Such compensating condenser is merely to compensate for the reactance of unit B and is not comparable to the 90-degree phase shifting expedients used in the conventional power-factor meter of the prior art. A power-factor meter built in accordance with this invention for a frequency range between 300 and 1000 cycles per second was accurate to within about 2 per cent over this range. The conventional type single-phase frequency meter of the prior art shows errors of 25 per cent over this range. My power-factor meter is, of course, suitable for use on a constant frequency circuit.

One set of specifications for a satisfactory frequency meter embodying my invention for a frequency range of 300 to 1000 cycles is as follows: Use 56 turns in each of the stationary current coils 1, 2, 3 and 4. Use 400 turns in each of the moving coils 5, 6, 7 and 8. Use a 5-ampere copper oxide rectifier at 15 and a 40-milliampere copper oxide rectifier at 16. Use a 2100-ohm resistor at 20. The filter 17 may consist of a 4-mf. condenser and a 3.2-henry inductance. A 0.2-mf. compensating condenser may be used at 18, and the resistance at 19 may be 2000 ohms. If desired, a variable resistance may be used in one of the potential circuits as at 21 for calibration purposes and for varying the ampere-turn ratio between units A and B.

My frequency meter may be used to measure either lagging or leading power factor, but not both, unless other means are provided, or it is otherwise known when the power factor changes from lag to lead and vice versa. For instance, consider the unity power-factor condition represented in Fig. 4. A decrease in power factor from this condition in either the lead or lag direction will decrease the torque of the wattmeter element in the same way, and hence, the meter as described is intended for the measurement of either all leading or all lagging power factor, and will not in itself distinguish between leading and lagging power factors.

In Fig. 6, there is represented a modification of my invention where the torque response relations of the two instruments AI and BI are compared visually instead of mechanically. Instruments AI and BI may be like those of Fig. 1 except that both will have zero return springs which bias their pointers 22 and 23 to the zero points of their respective individual scales 24 and 25. Instrument AI is energized through rectifiers as for instrument A, Fig. 1, and hence, produces a torque in a counterclockwise direction proportional to and measurement of volt-amperes, and its scale 24 is calibrated accordingly. Instrument BI is a conventional A.-C. wattmeter producing a torque in a clockwise direction, and its scale 25 is calibrated accordingly. The instruments are arranged so that their pointers 22 and 23 cross each other over their deflection ranges, and since the ratio of $$\frac{watts}{volt\text{-}amperes} = \frac{EI \cos \phi}{EI} = \cos \phi = \text{power factor}$$

a chart 26 may be provided on which the crossing point 27 of the pointers may indicate, and this chart may then be graduated in power-factor lines.

Thus, if the power factor be held at .8 and the volt-amperes and watts be varied over the range of deflection of the instruments AI and BI, the crossing points of their pointers will fall on a line which can then be marked .8 P. F. The chart is plotted with other lines corresponding to other torque ratios and power factors until we have a chart graduated in power factor as represented and from which the power factor within the range of operation of the instruments may be read. Thus, in Fig. 6, the wattmeter reading is 60, the volt-ampere reading is 80, and the power factor reading is .75. The power factor can also be computed thus $$\frac{60}{80} = \frac{6}{8} = .75$$

While the watt and volt-ampere scales are unnecessary so far as the measurement of power factor is concerned in Fig. 5, their use is obviously desirable. Since instrument AI is energized by direct current as in Fig. 1 for unit A, the measurements are reliable over a wide range of frequency variation.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Power-factor responsive apparatus comprising a pair of dynamometer instrument units each having stationary and rotatable cooperating winding elements, connections for energizing one winding element of each unit in proportion to the current flowing in a circuit the power factor of which is to be measured, connections for energizing the other winding element of each unit in proportion to the voltage of such circuit, rectifier means included in the energizing circuits to each of the winding elements of one unit only so that such unit will have a torque proportional to the volt-amperes of such circuit while the other unit will have a torque proportional to the watts of such circuit, and a common shaft on which both of the rotatable winding units are secured in such angular relation that the rotary position of the shaft is determined by the torque ratio between the two units and varies with the power factor of such circuit.

2. Power-factor responsive apparatus comprising a pair of dynamometer measuring units of the type having stationary and moving coil elements and a range of deflection of 90 degrees between their zero and maximum torque positions, connections for energizing the coil elements of one of said units in proportion to the current and voltage of an alternating current circuit the power factor of which is to be measured so that said unit has a torque response proportional to the watts of such circuit, connections including rectifier means for energizing the coil elements of the other unit in proportion to the current and voltage of such circuit so that it will have a torque response proportional to the volt-amperes of such circuit, and a common shaft on which the moving coil elements of both units are mounted such that when the moving coil element of one unit is in its zero torque position, the moving coil element of the other unit is displaced from its zero torque position by an angle between 90 and 180 degrees whereby the angular position of said shaft is determined by the ratio of the torques of the two elements and the power factor of such circuit.

3. Power-factor responsive apparatus comprising a pair of dynamometer type measuring units of the type having stationary moving coils and a range of deflection of 90 degrees between their zero and maximum torque positions, connections for energizing the stationary and moving coils of one unit in proportion to the current and voltage respectively of an alternating current circuit to be metered, the connection to such moving coil including means for compensating for the reactance of such unit, said unit developing a torque proportional to the watts of such circuit, connections including rectifying means for energizing the stationary and moving coils of the other unit in proportion to the current and voltage respectively of the circuit to be metered, at least one of said last-mentioned connections including a filter for smoothing the rectified current therein, said last-mentioned unit developing a torque proportional to the volt-amperes of such circuit, and a common shaft on which the moving coils of both of said units are secured such that the zero torque positions of said units are displaced by an angle between 90 and 180 degrees.

4. Power-factor responsive apparatus according to claim 3, in which the ratio of ampere turns between the watt responsive unit and the volt-ampere responsive unit is of the order of 1.15/1 and the angle between the zero torque positions of the moving coil elements is of the order of 150 degrees.

5. Power-factor responsive apparatus comprising a pair of dynamometer instrument units each having stationary and rotatable cooperating winding elements, connections for energizing one winding element of each unit in proportion to the current flowing in a circuit the power factor of which is to be measured, connections for energizing the other winding element of each unit in proportion to the voltage of such circuit, rectifier means included in the energizing circuits to each of the winding elements of one unit only so that such unit will have a torque proportional to the volt-amperes of such circuit while the other unit will have a torque proportional to the watts of such circuit, a scale calibrated in terms of power factor, and indicating means operated jointly by said instruments to give power factor measurement indications on said scale.

RALPH M. ROWELL.

REFERENCES CITED

The following references are of record in the file of this patent:

UNITED STATES PATENTS

| Number | Name | Date |
|---|---|---|
| 1,253,297 | Taylor | Jan. 15, 1918 |
| 2,173,487 | Seright | Sept. 19, 1939 |
| 2,218,697 | Burkhart | Oct. 22, 1940 |
| 2,414,317 | Middel | Jan. 14, 1947 |
| 2,475,190 | Levy | July 5, 1949 |

OTHER REFERENCES

Publication I, "Crossed-Coil Power-Factor Meters," N. P. Millar, AIEE Technical Paper 44-33, December 1943, page 15, Figures 1a and 2. (Copy in Div. 69.)